US005600318A

United States Patent [19]
Li

[11] Patent Number: 5,600,318
[45] Date of Patent: Feb. 4, 1997

[54] SEISMIC DATA ACQUISITION SYSTEM

[75] Inventor: Xuguang Li, Sugar Land, Tex.

[73] Assignee: Western Atlas International, Inc., Houston, Tex.

[21] Appl. No.: 396,128

[22] Filed: Feb. 28, 1995

[51] Int. Cl.⁶ .............................. H04B 14/04; G06F 15/00
[52] U.S. Cl. ............................... 341/143; 341/61; 364/734
[58] Field of Search ................. 341/143, 61; 364/724.01, 364/734

[56] References Cited

U.S. PATENT DOCUMENTS

| | | | |
|---|---|---|---|
| 4,193,118 | 3/1980 | Nash et al. | 364/434 |
| 5,235,534 | 8/1993 | Potter | 364/724.01 |
| 5,465,270 | 11/1995 | Beauducel et al. | 375/242 |
| 5,512,894 | 4/1996 | Ikeyama et al. | 341/61 |

Primary Examiner—Jeffrey A. Gaffin
Assistant Examiner—Peguy JeanPierre
Attorney, Agent, or Firm—Richard A. Fagin

[57] ABSTRACT

The present invention is a method of processing digitized signal samples generated by a free running analog-to-digital converter and sampled at a first sample rate. The method includes the steps of convolving the digitized signal samples with a single-stage digital filter and generating a series of resampled signal samples having a second sample rate no greater than the first sample rate. The resampled signal samples are synchronized with a predetermined time reference during the step of generating the series of resampled signal samples.

The present invention is also an apparatus for recording seismic surveys. The apparatus comprises: a delta-sigma analog-to-digital converter; a means for calculating an average of a plurality of outputs of the delta-sigma converter; a means for subtracting the average from a single output of the converter; and a single-stage digital filter which has the capability of synchronizing digital signal samples from the delta-sigma converter to a predetermined time reference and can resample the digital signal samples to a lower sampling rate than that rate provided by the delta-sigma converter.

13 Claims, 14 Drawing Sheets

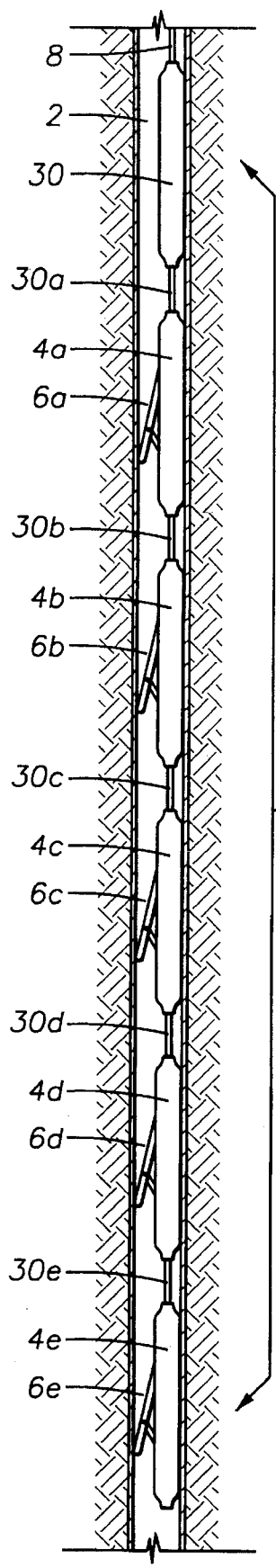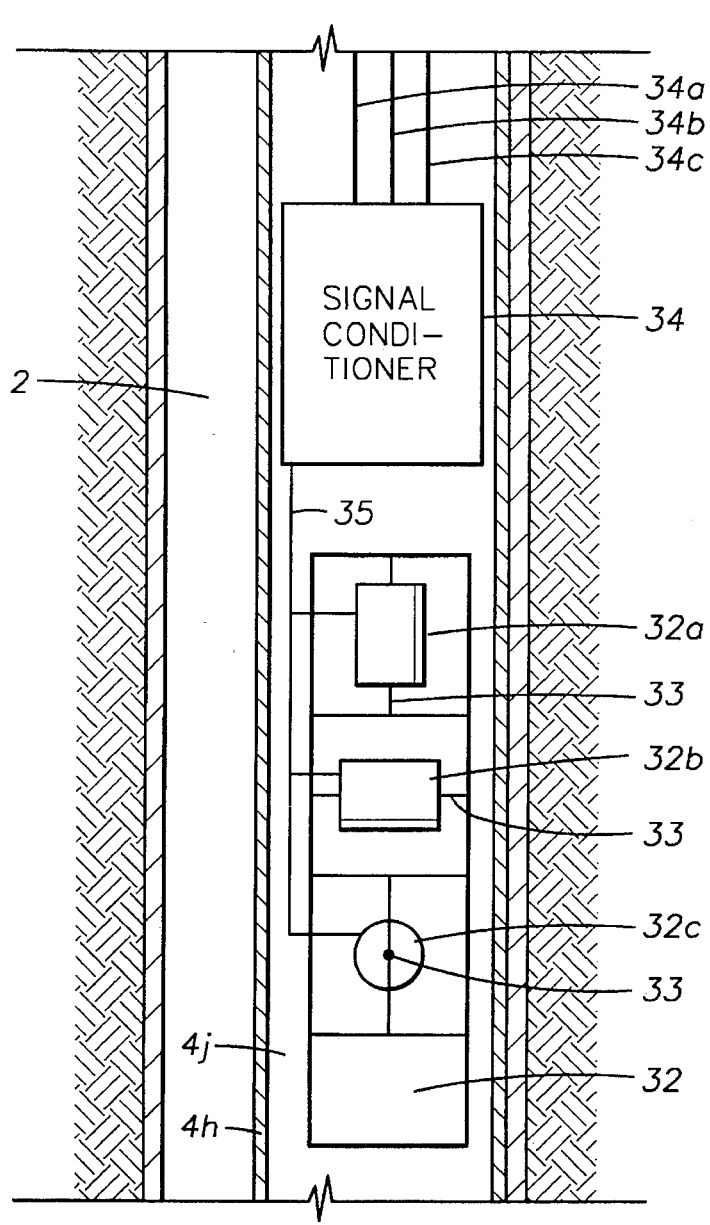
FIG. 2
FIG. 3

SEISMIC DATA ACQUISITION SYSTEM

BACKGROUND OF THE INVENTION

1. Field of the Invention

The present invention is related to the field of geophysical exploration. More specifically, the present invention is related to a system for acquiring and recording seismic signals measured by a sensor.

2. Discussion of the Relevant Art

Equipment which is used for geophysical surveying typically includes a digital data recorder. The digital data recorder generates digital samples, at spaced apart time intervals, of signals generated by at least one seismic sensor responsive to a seismic energy source. The digital data recorder typically can also store the digital samples or transmit the samples to another device capable of storing the digital samples.

In a typical seismic survey, the seismic energy source is actuated, and the signals generated by the at least one sensor are conducted to the digital data recorder.

The digital samples which are made and stored in the digital data recorder during the seismic survey represent the amplitude of the signals at the instant in time at which each of the samples is made. Processing of the digital signal samples is generally performed after they are stored in the recorder. Processing is performed in order to determine certain characteristics of an earth formation, such as acoustic velocity and the possible presence of acoustic impedance discontinuities in the earth formation.

Various methods are known in the art for generating digital samples and storing the signal samples in formats which facilitate the processing. For example, one method of generating digital samples includes the use of a floating point analog-to-digital converter (ADC). The floating point ADC measures the amplitude of the signal at spaced apart time intervals, and converts each measurement of the amplitude into a multiple-bit binary number. The floating point ADC begins sampling only when controlled to do so by an external command signal, such as an activation signal sent to the seismic energy source to actuate the source. Floating point ADC's therefore are easy to synchronize with the actuation of the source, so that the time at which any particular signal sample is acquired relative to the source actuation can be accurately determined.

A limitation of the floating point ADC is that it requires, interposed between it and the sensor, an analog anti-alias filter having specific response characteristics. The analog anti-alias filter removes components of the signal which have a frequency above a maximum sampling frequency. The maximum sampling frequency typically is one-half the frequency (the inverse of the elapsed time between the spaced apart time intervals) at which the ADC operates. In order to preserve information contained in the signal at frequencies near the maximum sampling frequency, the analog anti-alias filter must have a so-called "sharp roll-off" characteristic, that is, the filter must decrease response rapidly with increasing frequency above a maximum passband frequency of the filter. Analog anti-alias filters having sharp roll-off are difficult and expensive to build.

It is also known in the art to generate digital samples of an analog signal, such as the signal from the seismic sensor, by using a delta-sigma converter. The delta-sigma converter comprises a single-bit digitizer, called a modulator, and an integrator. The output of the modulator comprises a serial stream of very short duration digital bits which are non-zero for an equivalent duration of time proportional to the amplitude of the signal being digitized. The modulator typically operates at a frequency much higher than the maximum frequency contained in the signal. For example, seismic survey signals of interest typically have components extending only to a frequency of 2,000 Hz, but a modulator used in seismic survey equipment can operate at 1,024,000 Hz (1.024 mHz). Because the modulator operates at a very high frequency relative to the frequency of the signals being sampled, it is typically not necessary to include a sharp roll-off anti-alias filter in seismic survey equipment using delta-sigma converters.

The output of the delta-sigma modulator is typically conducted to the integrator, which provides a digital signal output comprising multiple-bit binary numbers generated at a much lower frequency than the operating frequency of the modulator. A typical integrator used in seismic survey equipment operates at a frequency of 4,000 Hz. Because the digital samples from the modulator are used to generate an output from the integrator at a much lower frequency than the operating frequency of the modulator, it is necessary to filter high-frequency components out of the samples conducted from the integrator to avoid aliasing. The components which must be filtered out of the modulator output typically have a frequency of one-half or more of the operating frequency of the integrator. For example, in the integrator used in seismic survey equipment as previously discussed, components having a frequency above 2,000 Hz should be filtered out of the modulator output. Resampling anti-alias filtering is typically performed by a digital filter, such as a finite impulse response (FIR) filter.

A drawback to using delta-sigma converters is that the delta-sigma converter is free running, meaning that it does not begin sampling under control of an external command signal. The delta-sigma converter is therefore difficult to synchronize to an external time reference, which for example can be the previously described activation signal used to actuate the seismic energy source.

It is known in the art to use digital finite impulse response (FIR) filters, similar to those used in anti-alias filtering the output of the delta-signal modulator, in order to synchronize the output of a delta-sigma converter to a predetermined time reference. Digital signal samples which are output from the integrator are processed through the FIR filter so that a reconstructed digital signal sample value can be calculated exactly at a time value which is coincident with the predetermined time reference. Subsequent digital signal samples spaced apart in time at intervals corresponding to the output frequency of the delta-sigma modulator, or to any other sample rate lower than the integrator operating frequency, can also be calculated by using the FIR filter.

A drawback to seismic survey equipment systems known in the art which use delta-sigma converters and FIR filters is that they typically require use of a two-stage or multiple-stage FIR filter. The samples output from the converter must be FIR filtered once to remove frequency components in the modulator output above the maximum frequency capable of being processed in the integrator, and FIR filtered a second time to synchronize the once-filtered samples with the predetermined time reference. Using two-stage or multiple-stage digital FIR filters can increase distortion of components of the signal which have frequencies within the filter passbands, because each stage of the digital FIR filter introduces a so-called "passband ripple" to the signal response in the passband, the distortion compounding with each filter stage. Passband ripple is an artifact of the mathematical algorithm of any digital filter, and cannot be completely eliminated from any individual digital filter stage.

Another drawback to using two-stage or multiple-stage FIR filters is that it is often impossible to generate digital signal samples containing higher seismic frequencies, typically above 1,000 Hz, using a two or more stage FIR filter because this filter can use an excessive amount of computation time. Typically, the two-stage FIR filter used in seismic survey equipment is limited to use with signal frequencies of about 125 Hz, which corresponds to a digital sample rate of 2 milliseconds, or a maximum sampling frequency of about 500 Hz.

Digital data recorders known in the art also include circuits to remove low level direct current (DC) voltages. DC may be impressed on analog signal lines from seismic sensors by various sources such as biasing errors in analog signal amplifiers forming part of a seismic recording system, or by rectification of signals generated by radio equipment or electric power lines which can occur in analog amplifier circuits in the recording system. It is preferable to remove the DC voltages from the signal before recording the digitized signal so that signals from a plurality of sensors recorded simultaneously will all be recorded as having substantially the same output level when there is no seismic energy input to the sensors. It is known in the art to remove the DC voltages by interposing an analog high-pass filter between the sensor and the digital data recorder. A limitation of using a high-pass filter is that it is very difficult to design an analog filter which can provide the required DC removal without also attenuating low frequency seismic signals in the range of 0.1 to 10 Hz. Attenuation of low frequency seismic signals can reduce the quality of information obtained from the seismic survey.

It is an object of the present invention to provide a digital recording system for seismic surveys which employs a delta-sigma converter using a single-stage FIR filter to perform the processes of bandpass filtering, resampling and synchronization.

It is a further object of the present invention to provide a means for adaptive DC removal for a seismic recording system without using a high-pass filter.

SUMMARY OF THE INVENTION

The present invention is a method of processing digitized signal samples generated by a free running analog-to-digital converter and sampled at a first sample rate. The method includes the steps of convolving the digitized signal samples with a single-stage digital filter and generating a series of resampled signal samples having a second sample rate no greater than the first sample rate. The resampled signal samples are synchronized with a predetermined time reference during the step of generating the series of resampled signal samples. In a preferred embodiment of the invention, the method includes the step of generating an average of a plurality of digital signal samples generated by the analog-to-digital converter and subtracting the average from individual subsequent digital samples generated by the converter.

The present invention is also an apparatus for recording seismic surveys. A preferred embodiment of the apparatus comprises: a delta-sigma analog-to-digital converter; a means for calculating an average of a plurality of outputs of the delta-sigma converter; a means for subtracting the average from a single output of the converter; and a single-stage digital filter which has the capability of synchronizing digital signal samples from the delta-sigma converter to a predetermined time reference and can resample the digital signal samples to a lower sampling rate than that rate provided by the delta-sigma converter.

BRIEF DESCRIPTION OF THE DRAWINGS

FIG. 2 shows a seismic receiver system used in a wellbore.

FIG. 3 shows a portion of the seismic receiver system of FIG. 2, including seismic sensors, in more detail.

DESCRIPTION OF THE PREFERRED EMBODIMENT

The description of the preferred embodiment of the invention is divided into two sections. The first section generally describes the apparatus used in a wellbore seismic survey in order to better explain the origin of signals which are processed by the system of the present invention. The second section describes the operation of a digital data recorder including the system of the present invention.

1. Wellbore Seismic Survey System

Figure 1:
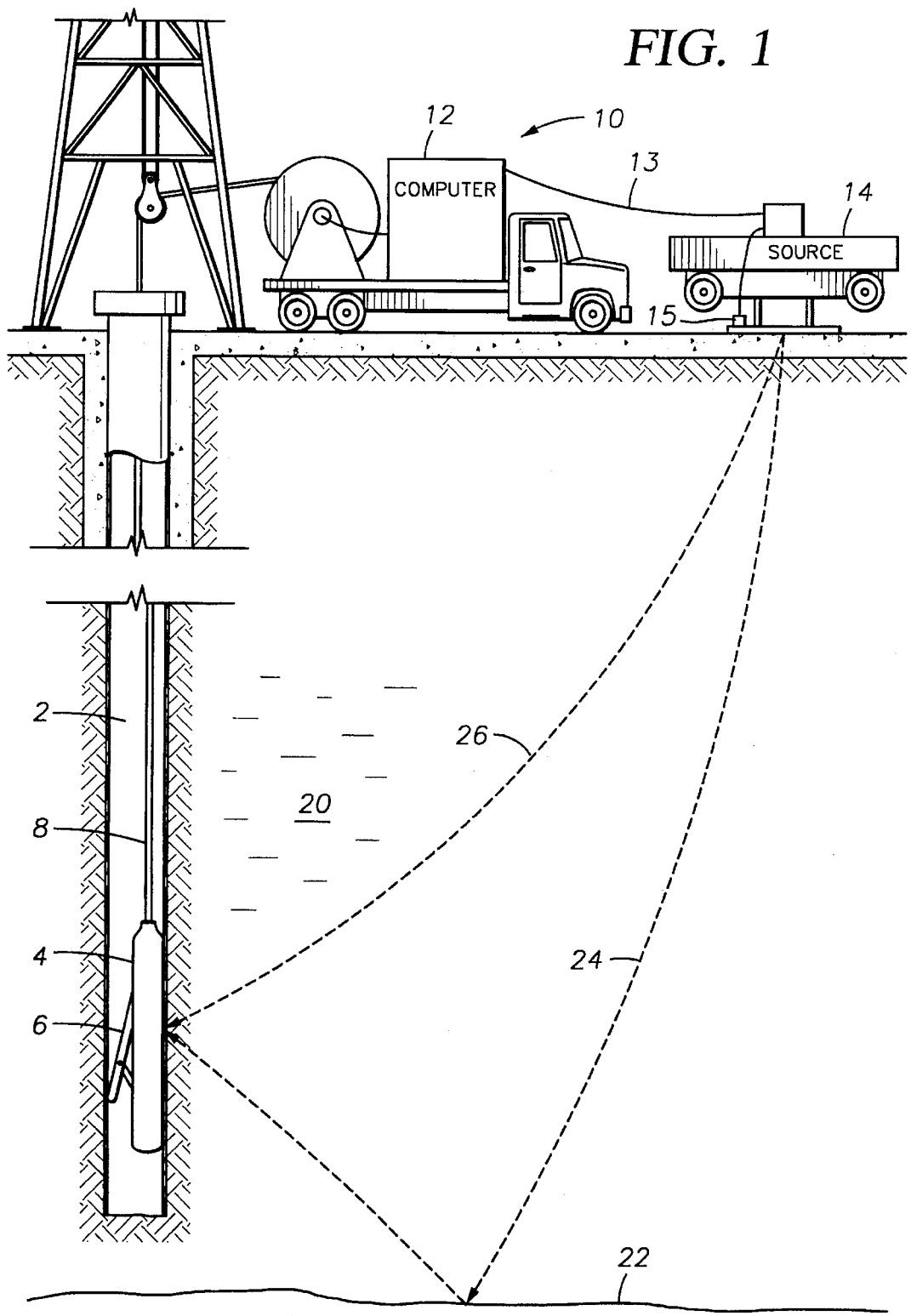
FIG. 1 shows a equipment used in a typical seismic survey.

FIG. 1 shows a seismic survey as it is typically conducted in a wellbore 2 using a borehole seismic receiver system. A seismic receiver 4 is connected to one end of an armored electrical cable 8 having at least one insulated electrical conductor (not shown), and is lowered into the wellbore 2 by means of the cable 8. The receiver 4 is lowered until it is positioned at a depth of interest in the wellbore 2. The receiver 4 is then typically forced into contact with the wellbore 2 wall by extension of a back-up arm 6 or similar device forming part of the receiver 4.

The cable 8 conducts electrical power to the receiver 4 from a logging unit 10 located at the earth's surface and electrically connected to the cable 8. The logging unit 10 includes a computer 12 which comprises a signal processing system according to the present invention, as will be further explained. The cable 8 also conducts signals from the receiver 4 to the logging unit 10.

The computer 12 further comprises a source controller (shown in FIG. 5 as 390, but not shown separately in FIG. 1 for clarity of the illustration) which is connected to a seismic energy source 14 also positioned at the earth's surface. The connection from the computer 12 to the source 14 is made using a linking cable 13. Alternatively, the linking cable 13 can be substituted by a radio telemetry unit (not shown).

In the present embodiment of the invention, the source 14 can be a vibrator unit. The present invention can also operate using other types of sources known in the art such as dynamite or air guns. The source 14 includes a near-field sensor 15 which measures an acoustic signature of the energy generated by the source 14. The signature measured by the near-field sensor 15 can be conducted to the computer 12 by the linking cable 13. In the present embodiment of the invention, the near-field sensor 15 can comprise an accelerometer unit.

Upon instruction by a program resident in the computer 12, the source controller (shown as 390 in FIG. 5) is caused to emit a control signal which is conducted to the source 14 over the linking cable 13. The control signal initiates operation of the source 14. The instruction from the computer 12 program to actuate the source controller (shown as 390 in FIG. 5) can be initiated by the system operator or function automatically under control of the program resident in the computer 12. When the source 14 is initiated, acoustic energy, shown generally at 18, radiates into an earth formation, shown as 20.

Some of the acoustic energy 18 reaches the receiver 4 directly by travelling through the earth formation 20. The portion of the energy reaching the receiver 4 directly is shown at 26. Another portion of the energy, shown at 24, can be reflected from an acoustic impedance discontinuity 22 which may be present in the earth formation 20 at a greater depth than the depth in the wellbore 2 at which the receiver 4 is positioned during the seismic survey. The seismic survey may be repeated by repositioning the receiver 4 at other depths in the wellbore 2 and again activating the source 14 following each time the receiver 4 is repositioned. Properties of the earth formation 20 can be determined from information contained in the signals generated by the receiver 4.

FIG. 2 shows the receiver 4 in greater detail. The receiver 4 can comprise five substantially identical geophone sections, shown as 4a through 4e. Each of the geophone sections 4a through 4e is mechanically and electrically interconnected to another section by connector links, shown as 30a through 30e. Each of the geophone sections 4a through 4e includes a back-up arm 6a through 6e, as previously described herein and shown in FIG. 1 as 6. Signals generated by each of the geophone sections 4a through 4e are electrically conducted over the links 30a to a telemetry unit 30 typically disposed at the top of the assembled geophone sections 4a through 4e and electrically connected to the cable 8.

A portion of one of the geophone section, such as 4a in FIG. 2, is shown in greater detail in FIG. 3. The geophone section 4a comprises a housing 4h which defines an interior 4j which is typically pressure sealed to exclude fluid which may be contained in the wellbore 2 from entering the interior 4j. Disposed in the interior 4j is a geophone assembly 32 comprising three substantially orthogonally positioned geophones 32a, 32b, 32c, each of which is mounted on gimbals 33 to enable gravity-induced rotation of the geophones 32a, 32b, 32c to maintain relative orthogonality when the receiver 4 is disposed in wellbores which may be inclined from vertical. Each of the geophones 32a, 32b, 32c responds principally to motion occurring along a single sensitive axis of each geophone 32a, 32b, 32c. Motion that is detectable by the geophones 32a, 32b, 32c can be induced by the acoustic energy (shown as 26 and 28 in FIG. 1). Different directions of motion of the acoustic energy 18 can be determined by measurements, for example, of different relative signal amplitudes from each of the geophones 32a, 32b, 32c.

Signals generated by the geophones 32a, 32b, 32c are conducted over wire connections 35 to a signal conditioner 34 which typically includes amplifiers and analog filters (not separately shown). The signal conditioner 34 provides three analog outputs 34a, 34b, 34c each corresponding to the signals generated by one of the geophones 32a, 32b, 32c. The analog outputs 34a, 34b, 34c are conducted over one of the links such as 30a to the telemetry unit 30, as will be further explained.

Figure 4:
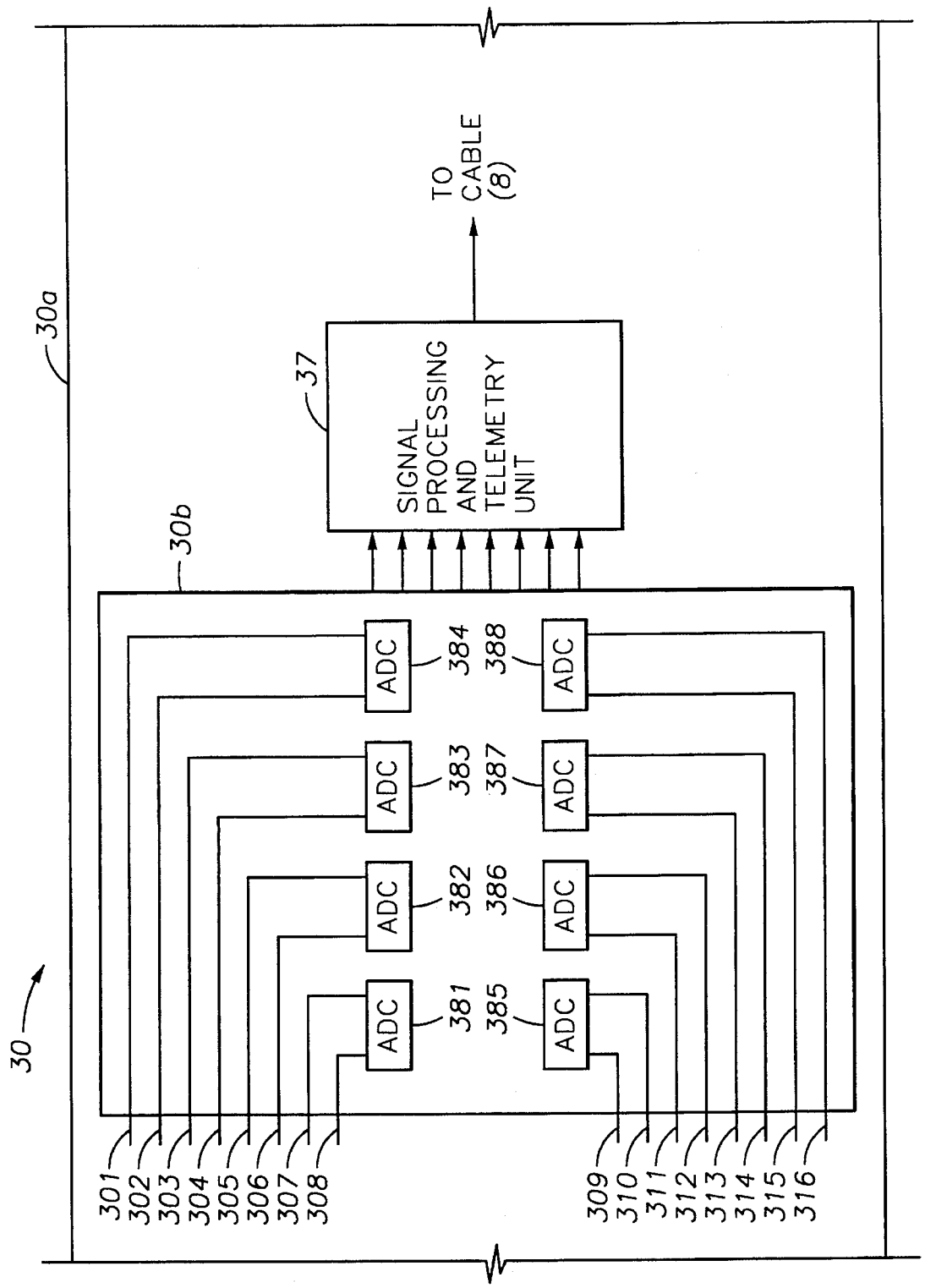
FIG. 4 shows a telemetry system used in connection with the seismic receiver system shown in FIG. 2.

The telemetry unit 30, shown in more detail in FIG. 4, includes a plurality of delta-sigma analog-to digital converters 381 through 388 which can be mounted on a signal processing board 30b disposed inside a housing 30a. Each of the analog signal outputs (shown as 34a, 34b, 34c in FIG. 3) from each one of the geophone sections (shown as 4a through 4e in FIG. 2) is conducted to one of a plurality of analog inputs, shown at 301 through 315, on the signal processing board 30b. In the present embodiment of the invention the delta-sigma converters 381–388 can be a dual-channel type such as one made by Crystal Products Company and sold under model number CS5336, so that each one of the converters 381–388 can be connected to as many as two of the analog inputs 301–315.

The analog signals present on the inputs 301–315 are each digitized by one of the converters 381–388. An output from the each one of the converters 381–388 forms sixteen-bit digital words, as will be further explained. The sixteen-bit digital words represent amplitudes of signals generated by the geophones (shown as 32a, 32b, 32c in FIG. 3) sampled at a rate of about 4,000 Hz. The sixteen-bit digital words generated by the converters 381–388 are conducted to a signal processing and telemetry unit 37, wherein the sixteen-bit digital words generated by the converters 381–388 can be filtered and resampled to a lower sample rate, as will be further explained. The sixteen-bit digital words are then reformatted into a serial bit pattern and are applied to the cable 8 for transmission to the logging unit 10. The signal processing and telemetry unit 37 comprises a digital signal processing (DSP) circuit which can be substantially the same as a digital signal processing circuit forming part of the computer (shown in FIG. 1 as 12). The operation of the digital signal processing circuit will be further explained.

Figure 5:
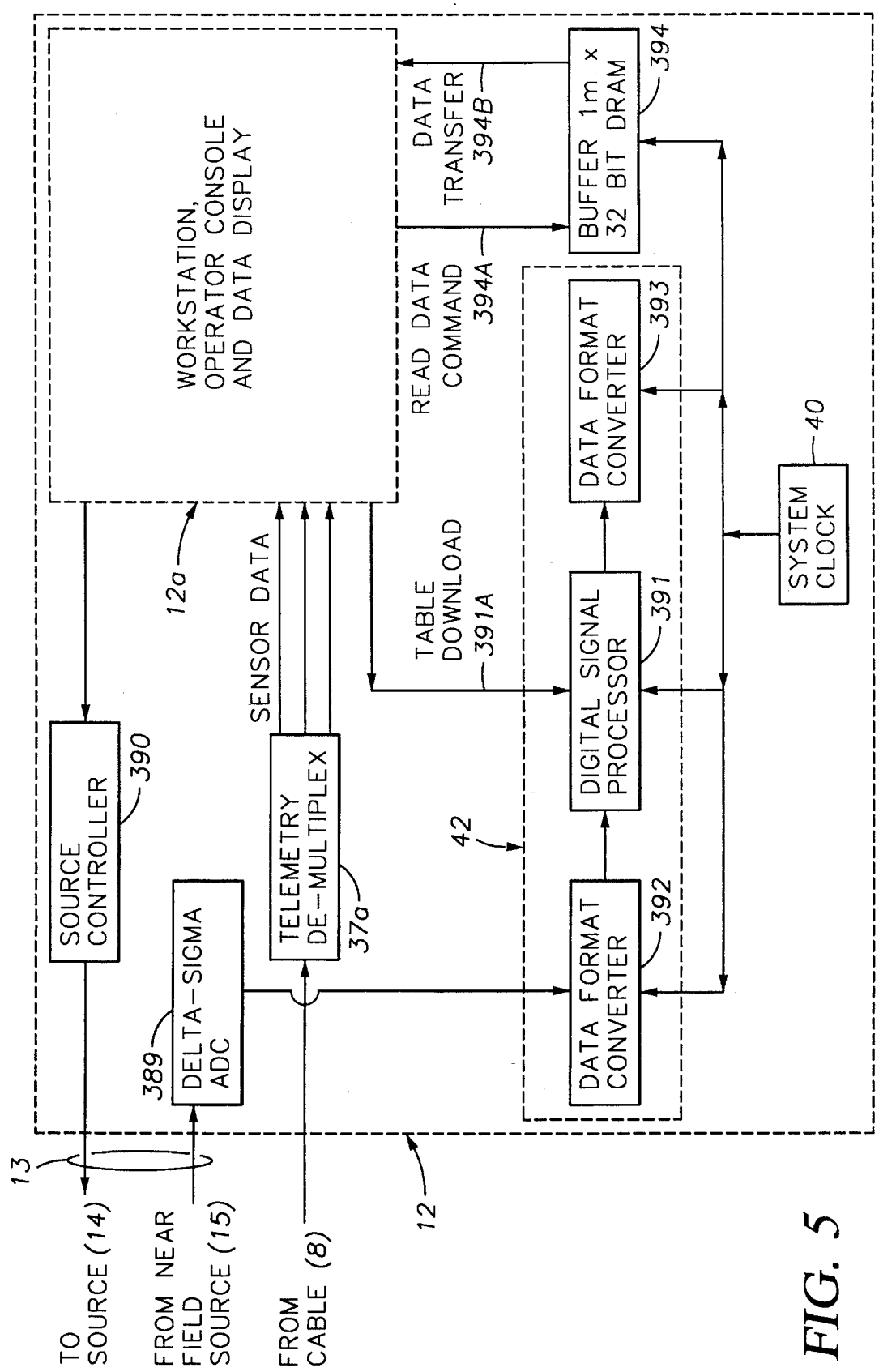
FIG. 5 shows in more detail a computer forming part of the equipment shown in FIG. 1, including a telemetry decoder and an analog-to-digital converter system having a digital FIR filter according to the present invention.

FIG. 5 shows the computer 12 in more detail. A workstation 12A forms part of the computer 12. The workstation 12A of the present embodiment can be a unit such as one sold by Sun Microsystems Inc. under model designation SPARC-10. The workstation 12A contains programs which control operation of the source controller 390, as previously described herein, and other programs which control operation of a digital signal processing circuit (DSP) 42, as will be further explained. The workstation 12A can also contain programs used for processing seismic signals generated by the receiver 4 in order to determine properties of the earth formation (shown as 20 in FIG. 1). The programs can be similar to those provided by a general computer software system produced by Atlas Wireline. Services and sold under the trade name SEISLINK-X.

The serial bit pattern which is applied to the cable 8 by the signal processing and telemetry unit (shown as 37 in FIG. 4) as previously described herein, is conducted to a telemetry demultiplexer 37a which forms part of the computer 12. The demultiplexer 37a reconverts the serial bit pattern into the plurality of sixteen-bit digital words representing signal amplitudes as applied to the inputs on the signal processing board (shown as 301–315 in FIG. 4). The output of the demultiplexer 37a is conducted to the workstation 12A for recording of the digital words and for later processing.

Included in the computer 12 is an additional delta-sigma analog-to-digital converter 389, which can be the same type as one of the converters (shown as 381–388 in FIG. 4) disposed in the telemetry unit 30. An analog signal generated by the near-field sensor (shown as 15 in FIG. 1) in response to the source 14 is conducted over the linking cable 13 to the additional converter 389, wherein the analog signal from the near field sensor 15 is converted into sixteen-bit digital words having a sample rate of about 4,000 Hz. The sixteen-bit digital words are in substantially the same format as the digital words generated in the telemetry unit 30 which represent signal amplitudes as measured by the geophones (shown as 32a, 32b, 32c in FIG. 3).

The computer 12 is shown in FIG. 5 as having one additional converter 389 for clarity of the illustration. The computer 12 shown in FIG. 5 can further include eight additional converters (not shown separately) which can be substantially the same as the additional converter 389 shown in FIG. 5. Including eight additional converters enables the computer 12 to digitally sample analog signals from as many as sixteen different analog signal channels, as may be required, for example, if the receiver (shown as 4 in FIG. 1) were to include analog signal outputs instead of digital signal outputs. A receiver 4 having analog signal outputs is known in the art and is described, for example, in "AWS-1300G Downhole Receiver", Atlas Wireline Services, Houston, Tex. 1993.

2. Operation of the Digital Signal Processor

Digital words output from the additional converter 389 are conducted to a first data format converter 392 which forms pan of the digital signal processing (DSP) circuit 42 as previously described herein. The DSP circuit 42 can be substantially the same as the circuit previously described herein as forming pan of the telemetry unit (shown as 30 in FIG. 4), and it is to be understood that processes described herein as performed by the DSP circuit 42 in the computer 12 can be substantially the same as processes performed by the DSP circuit in the telemetry unit 30. The DSP circuit 42 in the present embodiment can be a unit manufactured by Texas Instruments Inc., and sold under model designation TMS320C30. The change in data format performed by the first data format converter 392 is controlled by a program which can be resident in the DSP circuit 42. The first data format converter 392 changes the sixteen-bit words comprising the digital samples of the analog signals into thirty-two bit floating point format digital words. The format change enables a digital signal processor section 391 forming part of the DSP circuit 42 to process the digital signal samples using the system of the present invention.

Signals generated by the near-field sensor (shown as 15 in FIG. 1 ) which are converted to digital words in the additional converter 389 and are subsequently output from the first data format converter 392, comprise DC components. DC components are represented as non-zero values of the digital words sampled at times when there is substantially zero acoustic energy (shown for example as 26 in FIG. 1 ) amplitude imparted to the sensor 15. A set of instructions, which can form part of a program resident in the workstation 12A and can subsequently be downloaded as program tables into the processor 391 over a download line 391A. The set of instructions includes process steps by which the digital words entering the processor 391 are arithmetically averaged over a period of time which can be five seconds in duration, representing about 20,000 digital words. A new arithmetic average of the digital words is computed each time 20,000 digital words are conducted into the processor 391. The arithmetic averages thus computed substantially equal the magnitude of the DC components of the digital words used to calculate the average. The instruction set downloaded into the processor 391 also includes a subroutine which subtracts the arithmetic average value from each one of the next 20,000 digital words entering the processor 391. When the source controller 390 actuates the source 14, only the most recently calculated arithmetic average prior to the actuation of the source 14 is used in the subtraction subroutine during a period of time which can be five to ten seconds in duration. This period of time represents the time during which seismic signals from the receiver 4 are recorded in the workstation 12A. Only one value of the arithmetic average is subtracted from the digital words during signal recording to avoid the possibility of a "stair-step" change in signal value during signal recording.

The signal processor 391 also comprises a set of instructions which performs finite impulse response (FIR) filtration on the digital words. The FIR filter, as previously described, performs the functions of resampling the digital words from the 4,000 Hz sample rate to a lower sample, which in the present embodiment can be 500 Hz, 1000 Hz, 2000 Hz. The digital words can also be processed to be sampled at the initial sample rate of 4,000 Hz. As previously explained herein, resampling the digital words to a lower sample rate requires removal, or filtering, of signal components which have a frequency above one-half the desired lower sample rate to avoid aliasing. The anti-alias filtering is performed concurrently with resampling. A different FIR instruction set is downloaded into the processor 391 for each selected resampling rate.

The FIR filter instructions can be downloaded from the workstation 12A under control of the system operator. The system operator can select which lower sample rate FIR filter instructions are downloaded into the processor 391, depending on the maximum signal frequency needed to be preserved in the processing, as determined by the system operator. The maximum frequency preserved in processing typically is one-half the selected sample rate.

As previously described herein, the additional converter 389, and the digital words from the de-multiplexer 37a, represent digital samples of analog signals generated at spaced apart time intervals by free-running analog-to-digital converters, meaning that no external control acts as a time reference in initiating generation of the digital words. In order to be able to determine an elapsed time from the instant at which the source controller 390 actuates the source 14, the digital words in the processor 391 must be synchronized to the actuation of the source 14. The FIR filter instructions downloaded into the processor 391 enable generation of a digital word, representing an initial resampled signal value, at any predetermined time which is correspondent with one cycle of a system clock 40. The system clock 40 typically generates timing pulses in a cycle repeating at a rate of 1.024 mHz and the clock 40 is connected to the DSP circuit 42 and the additional ADC391. Program instructions can therefore be executed by the processor 391 at a speed correlative with the rate of the clock 40. Resampled digital words can therefore be generated to fall within any one cycle of the clock 40. Subsequent digital words generated by the processor 391 during resampling are spaced apart by an amount of time corresponding to the resampling rate, which in the present embodiment can be 0.25, 0.5, 1, or 2 milliseconds. It is contemplated that FIR filter instructions can be generated so that any other resampling rate can be derived which is less than or equal to the 4,000 Hz rate at which digital words are conducted in to the processor 391.

A plurality of digital words is filtered, resampled and synchronized by the processor 391 each time the source controller 390 actuates the source 14. The plurality of digital words filtered, resampled and synchronized in the processor 390 is then conducted to a second data format converter 393. The second data format converter 393 changes the 32-bit floating point format of each of the plurality of digital words into a 32-bit two's complement format which is interpretable by programs resident in the workstation 12A. The plurality of digital words is then conducted to a buffer 394 which can be a 1-megabyte×32-bit dynamic random access memory (DRAM), wherein the plurality of digital words is stored until an instruction from the workstation 12A, conducted over a read data command line 394A, causes the buffer 394 to transfer the digital words to the workstation 12A over a data transfer line 394B.

Digital words representing signals from the geophones (such as 32a, 32b, 32c in FIG. 3) can be stored in the workstation 12A each time the source 14 is initiated, as previously described herein.

Figure 6A:
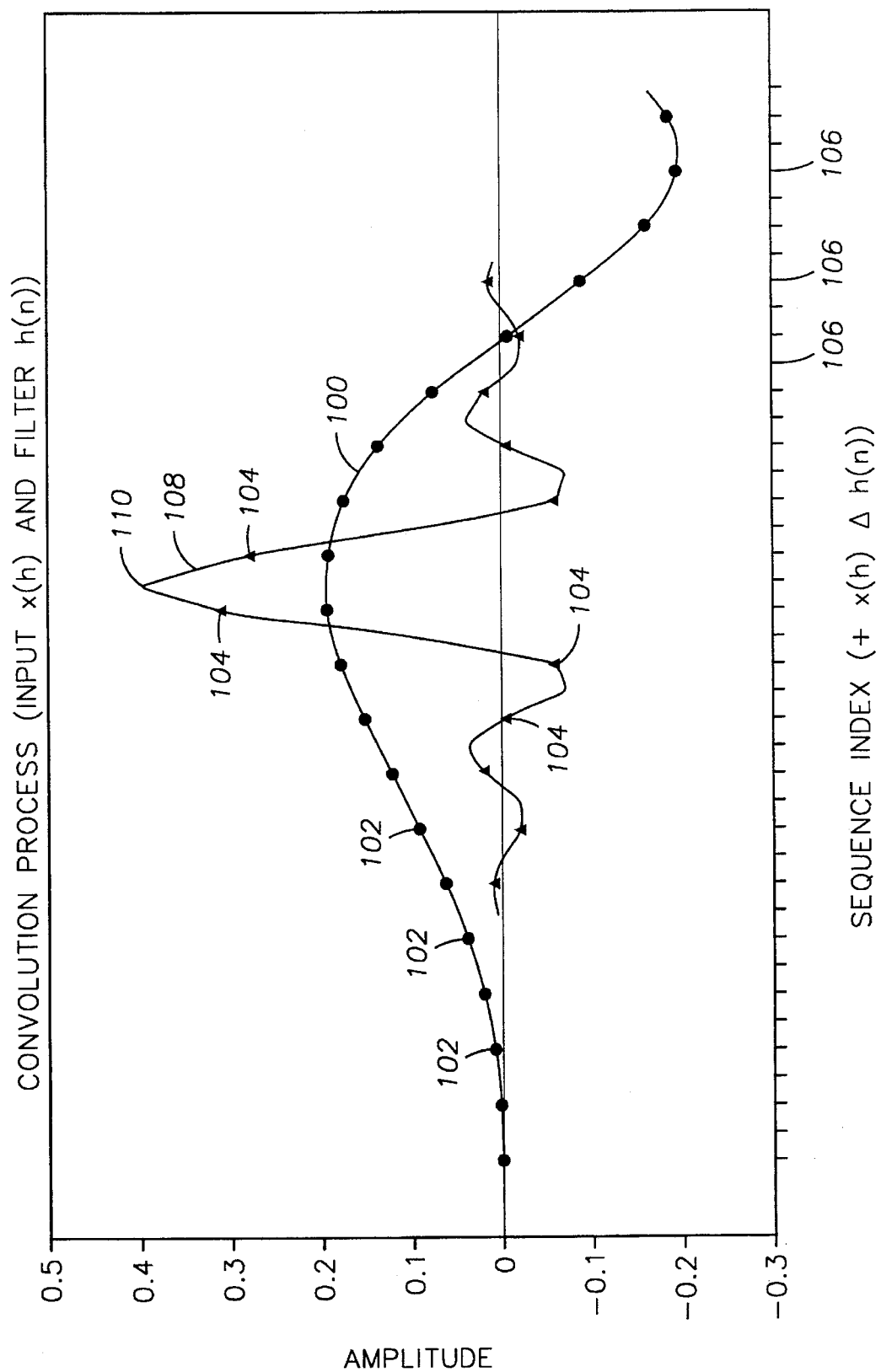
FIGS. 6A and 6B show a graphic representation of resampling digital words to a lower sample rate using a digital filter according to the present invention.
Figure 6B:
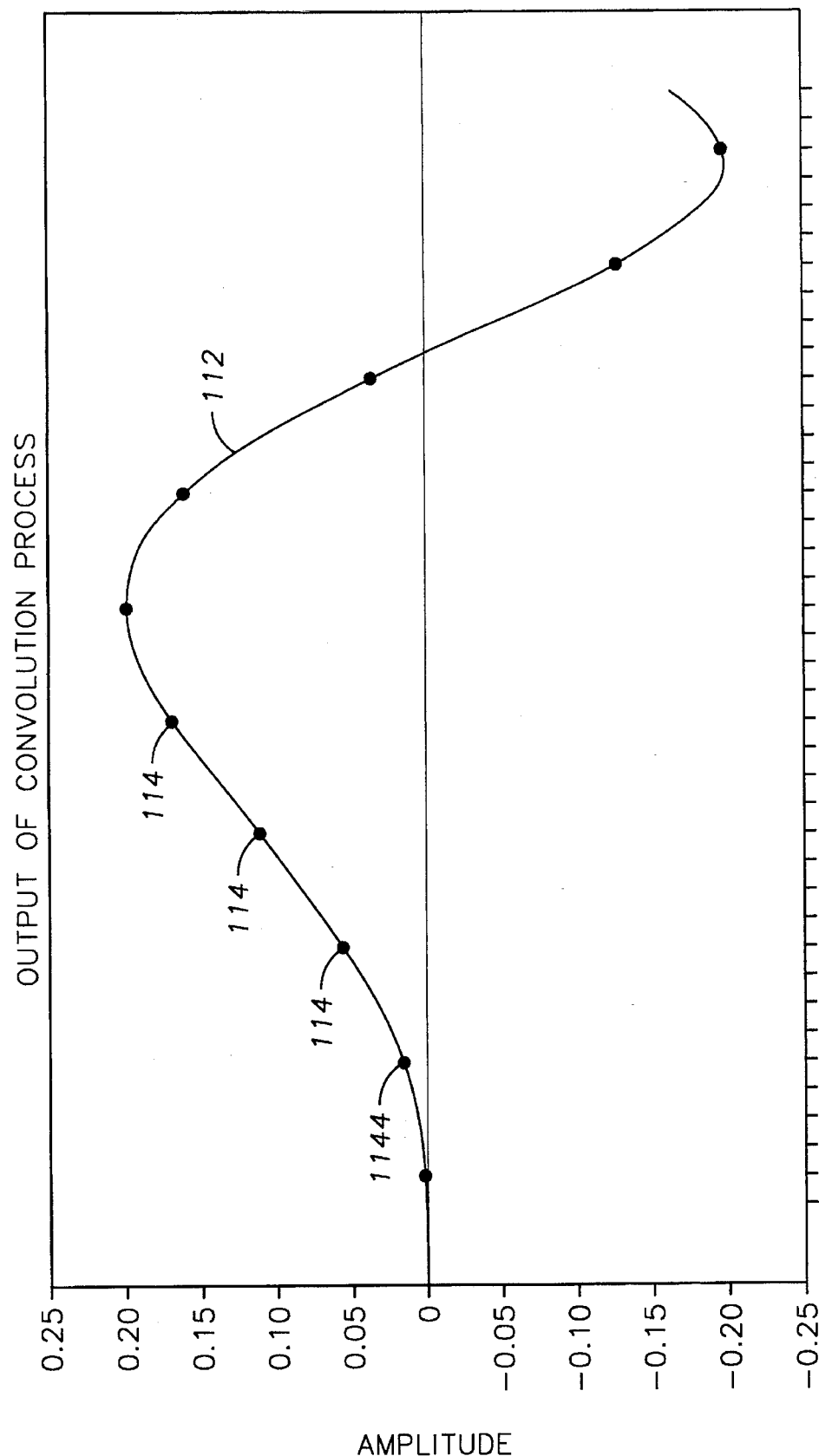

The synchronization process performed by the FIR filter in the processor 391 can be better understood by referring to FIGS. 6A and 6B. FIG. 6A is a graphic representation of an analog signal from one of the geophones (such as 32a in FIG. 3) shown as a smooth curve 100. The digital words which represent samples of the analog signal generated at the 4,000 Hz sample rate of the delta-sigma converter (such as 381 in FIG. 4) are shown at their representative numerical values on the graph as shown at 102. The FIR filter response is shown both as a curve at 108 and as individual weighting factor response points at 104. The FIR filter is adapted to generate an output value at a central response peak 110 by using input values from the analog signal 100 each multiplied by the time coincident filter weighting factor response points 104. In FIG. 6B, successively resampled output values, shown as digital word values on the graph at 114, can be computed by incrementing the time position of the filter response points by a sequence index 106, which can be a series of spaced apart time intervals occurring at a rate which is a multiple of the selected resampling rate. A smooth curve showing the resampled output is generally shown at 112. The sequence index 106 can correspond to small enough spaced apart time intervals to enable calculation of a resampled output curve 112 synchronized with a predetermined time reference such as the signal generated by the source controller (shown as 390 in FIG. 5) to initiate the source (shown as 14 in FIG. 1).

The total number of response points 104, also called filter taps, in a particular FIR filter can be related to the degree of filtering necessary to achieve the desired filter performance. In the present embodiment, the FIR filter used to resample at a rate of 2 milliseconds has 159 taps, the central peak of this filter generated at tap number 80. The FIR filter in the present embodiment of the invention used to resample at a rate of 1 millisecond has 127 taps. The 0.5 and 0.25 millisecond resampling FIR filters have 63 and 15 taps, respectively. The taps of the FIR filters of the present invention can be stored in the workstation (shown as 12A in FIG. 5) as numerical values in a table (not shown) and downloaded into the processor 391 on control by the system operator as previously described herein.

Stopband attenuation and passband response of the FIR filters used for the 2, 1, 0.5, and 0.25 millisecond resampling rates can be observed by referring to FIGS. 7 through 14.

Figure 7:
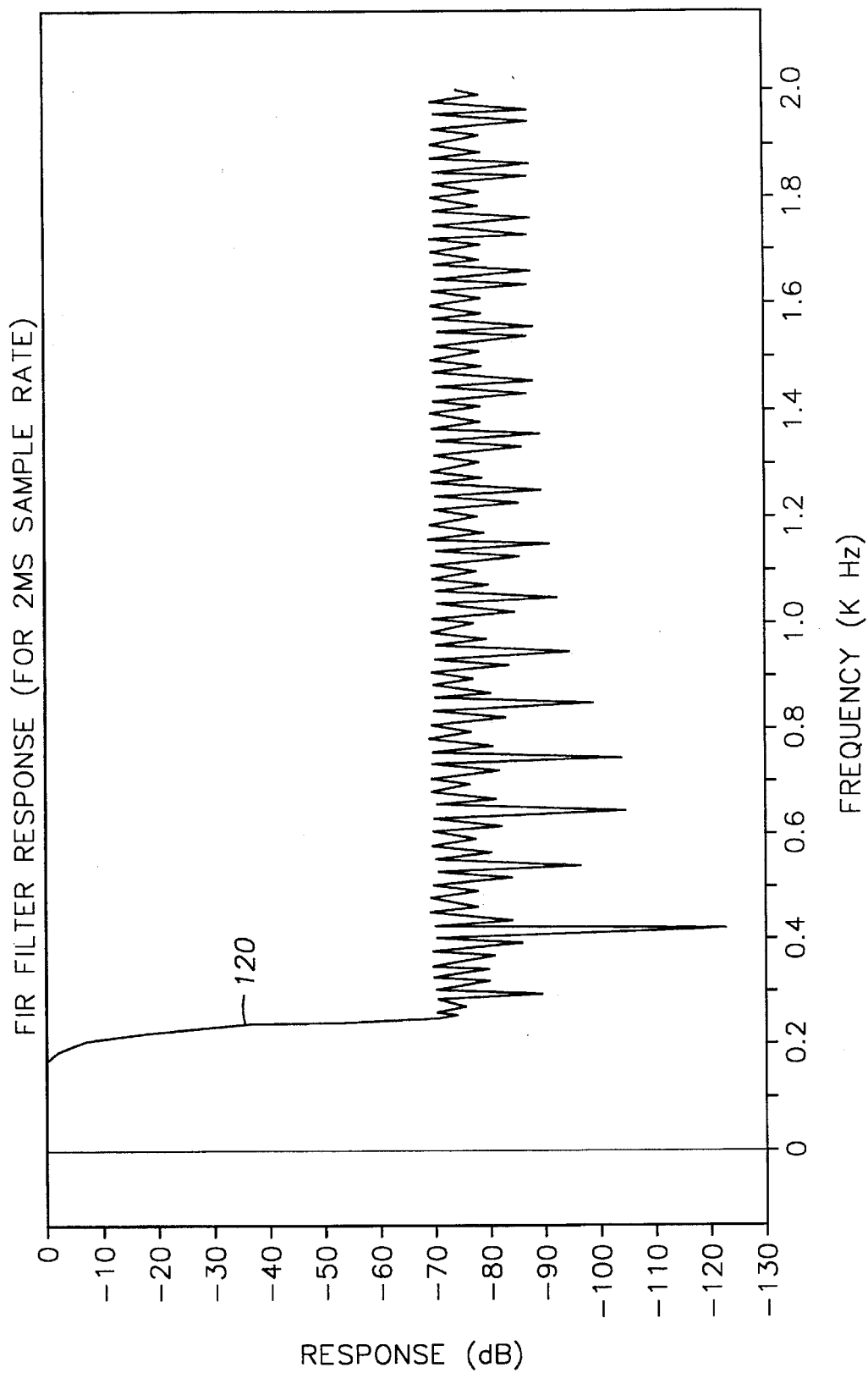
FIG. 7 shows attenuation response of a digital filter according to the present invention used to resample digital words to a 2 millisecond sample rate.
Figure 8:
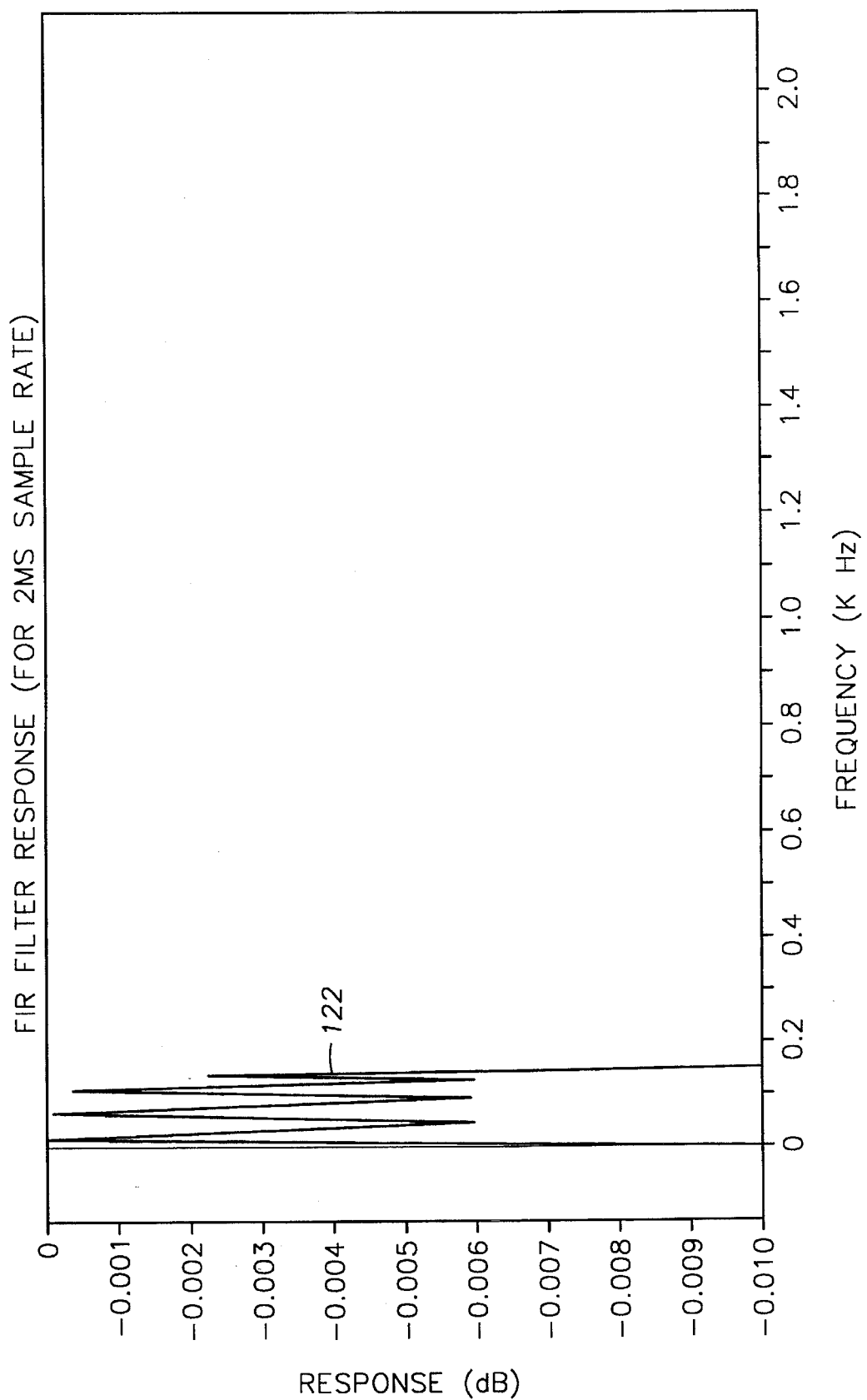
FIG. 8 shows the passband response of the filter in FIG. 7.

FIG. 7 shows the stopband attenuation as a curve 120, and FIG. 8 shows the passband response as a curve 122 of the FIR filter used to resample at a rate of 2 milliseconds.

Figure 9:
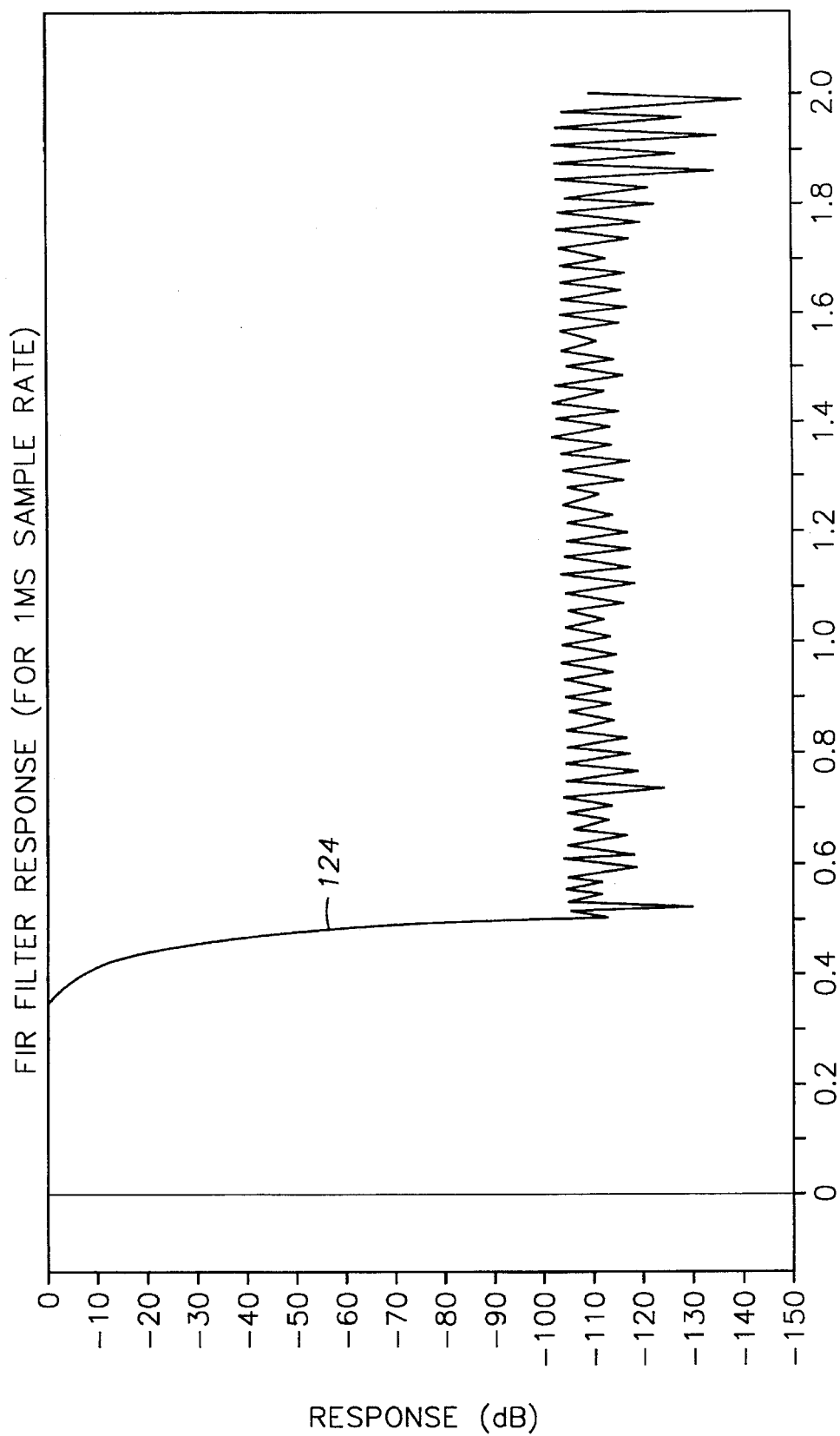
FIG. 9 shows attenuation response of a filter according to the present invention used to resample digital words to a 1 millisecond sample rate.
Figure 10:
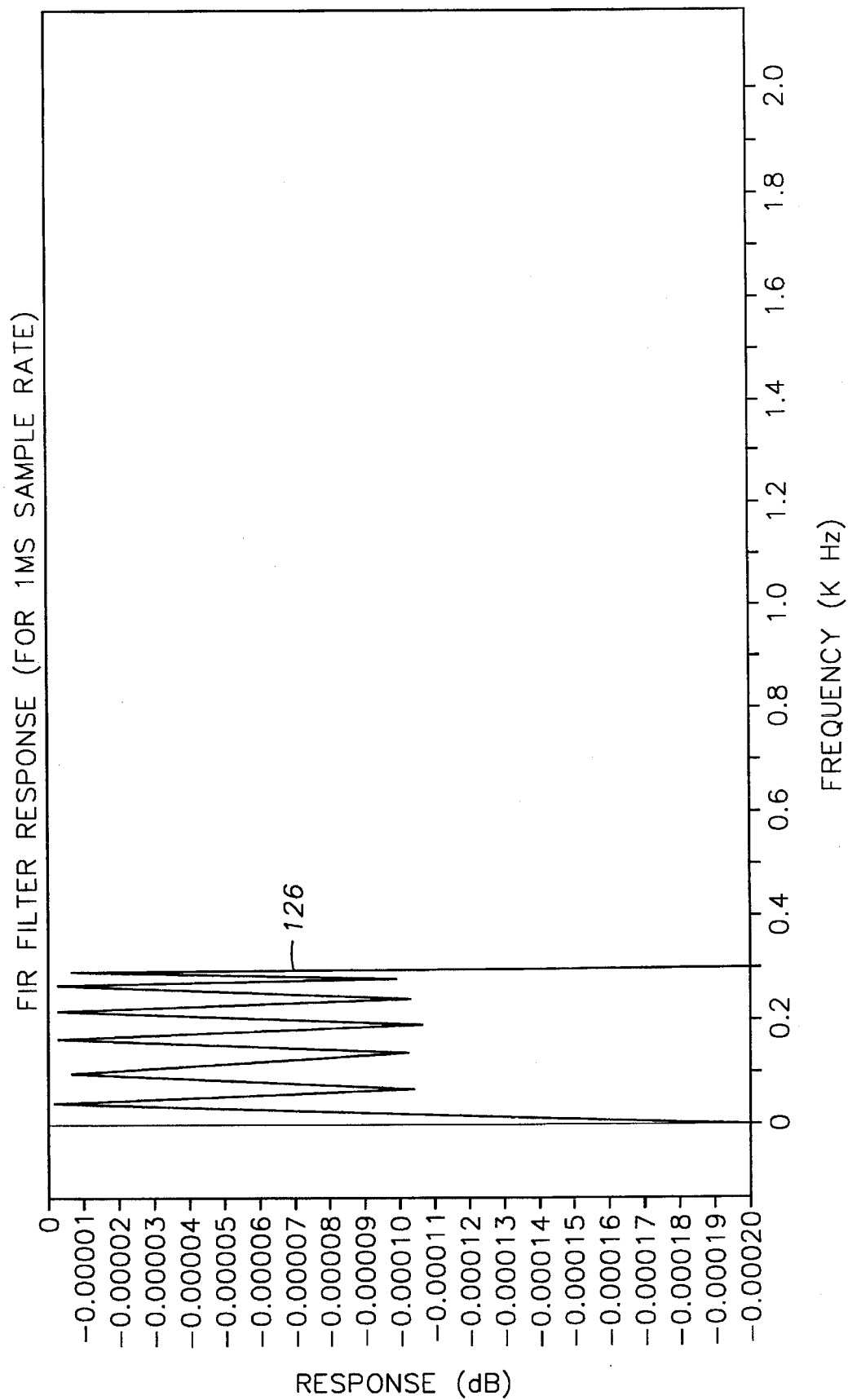
FIG. 10 shows the passband response of the filter in FIG. 9.

Attenuation response for the 1 millisecond resampling rate filter is shown in FIG. 9 as a curve 124, and the passband response for this filter is shown in FIG. 10 as a curve 126.

Figure 11:
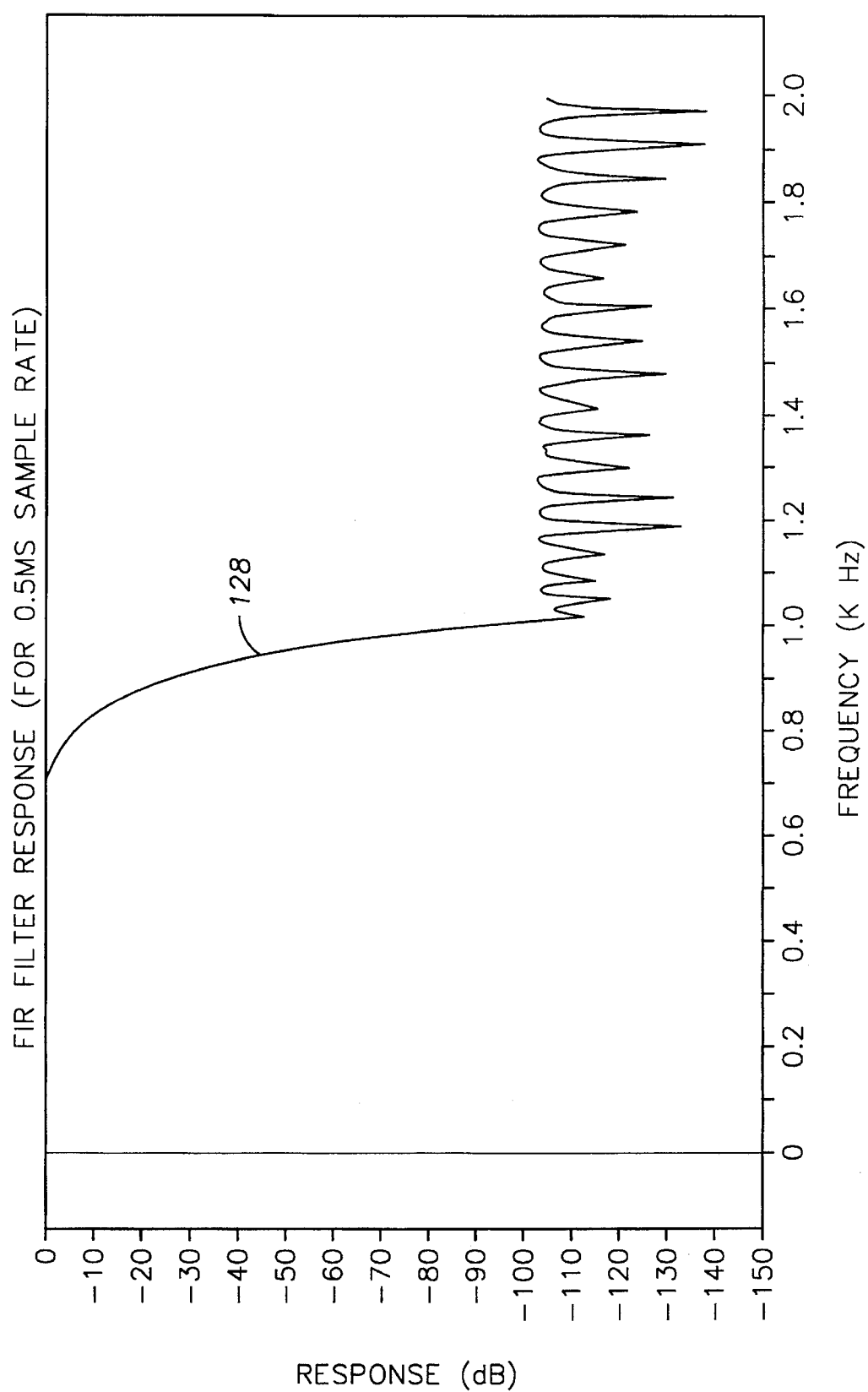
FIG. 11 shows attenuation response of a filter according to the present invention used to resample digital words to a 0.5 millisecond sample rate.
Figure 12:
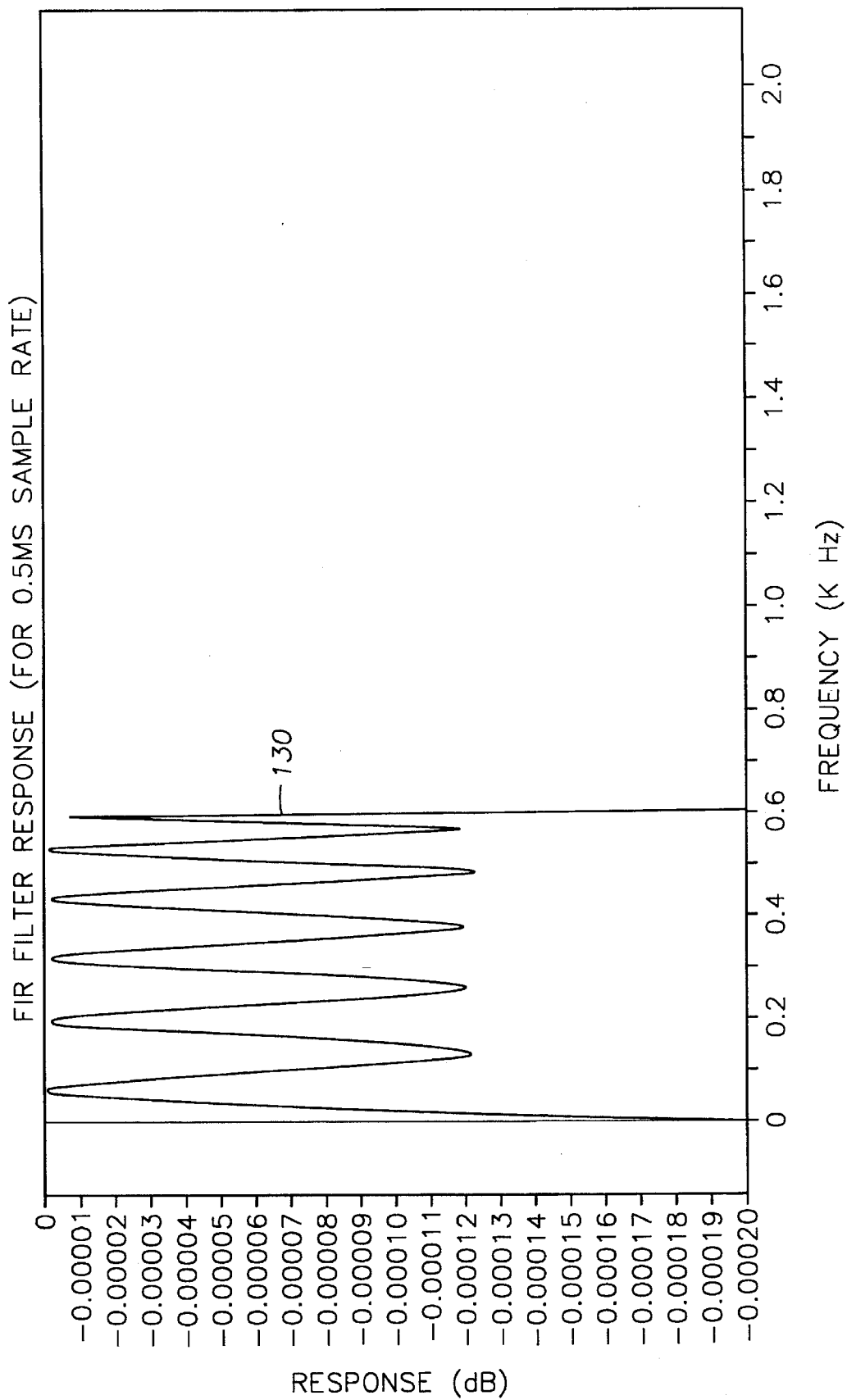
FIG. 12 shows the passband response of the filter in FIG. 11.

The 0.5 millisecond resampling rate FIR filter response is shown generally in FIG. 11 as a curve 128 representing the attenuation response, and in FIG. 12 as a curve 130 showing the passband response.

Figure 13:
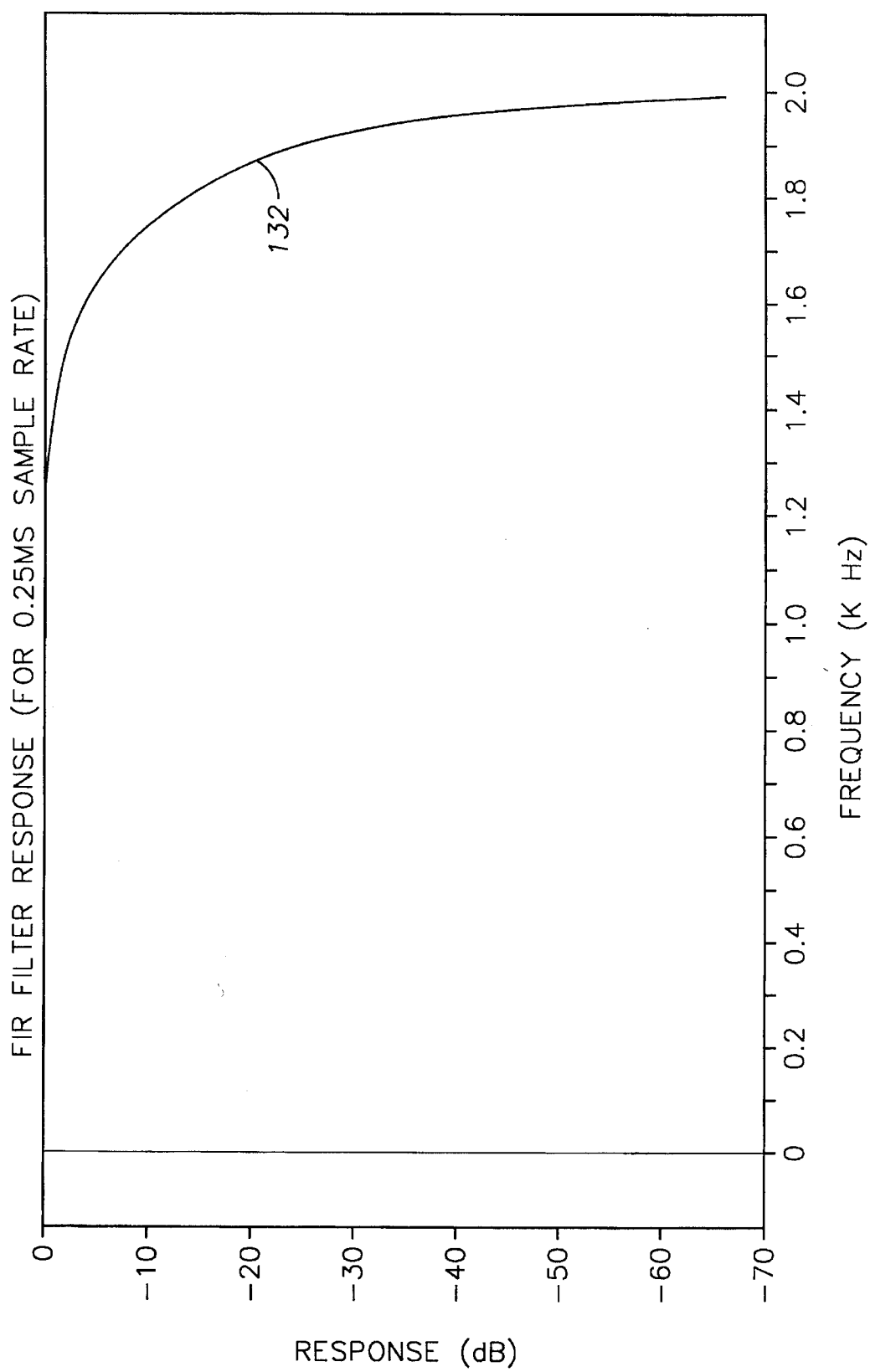
FIG. 13 shows attenuation response of a filter according to the present invention used to resample digital words to a 0.25 millisecond sample rate.
Figure 14:
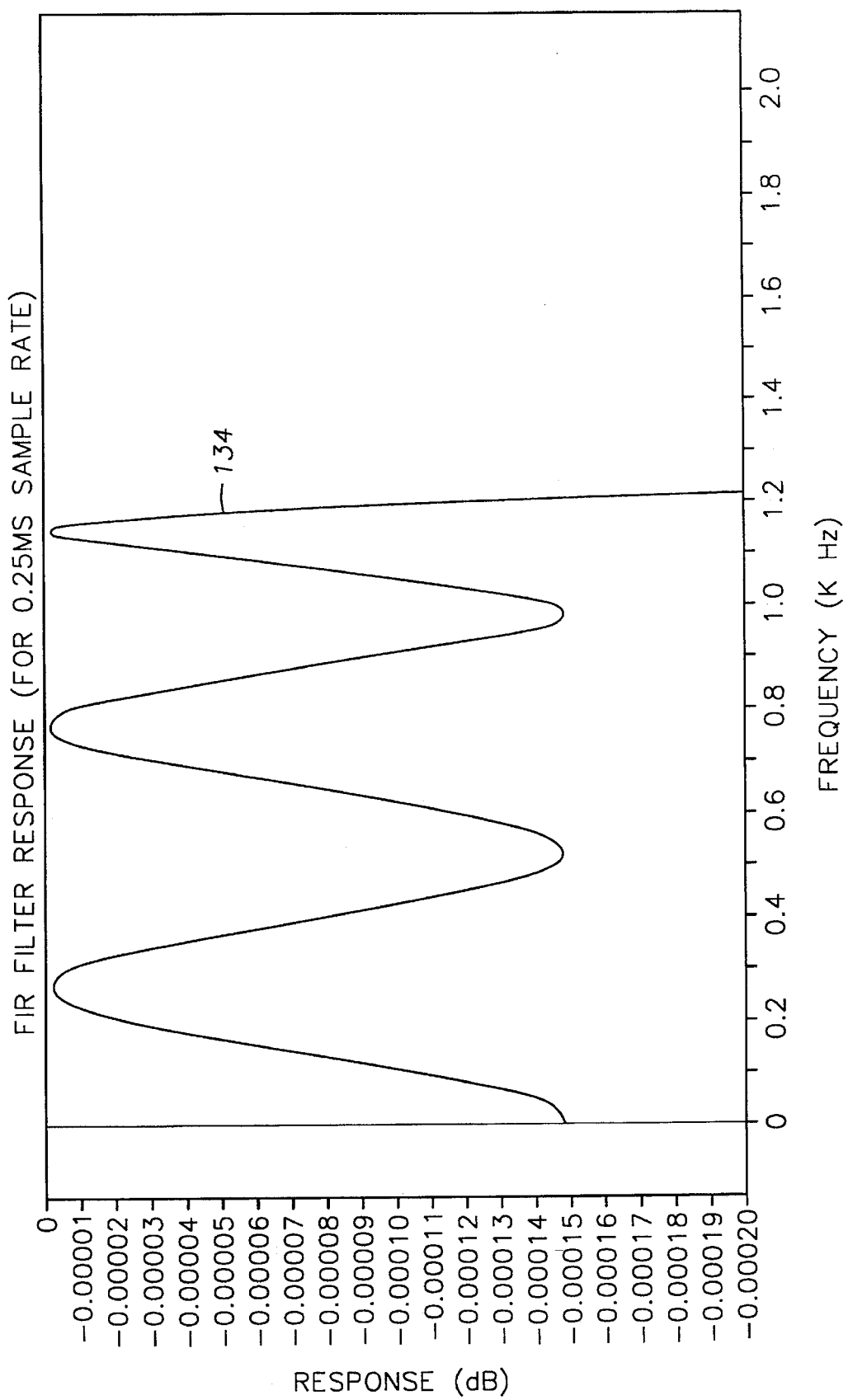
FIG. 14 shows the passband response of the filter in FIG. 13.

The 0.25 millisecond resampling rate filter attenuation response is shown in FIG. 13 as a curve 132. The passband response of the 0.25 millisecond filter is shown as a curve 134 in FIG. 14.

That a single-stage FIR filter can perform the functions of filtering, resampling and synchronization was determined by mathematical analysis. To demonstrate the analysis, a signal comprising unprocessed data can be represented by a function: x(n). In the analysis, x(n) represents a full bandwidth signal that is, its spectrum is nonzero for all frequencies, f, occurring in the range $-F/2 \leq f \leq F/2$. F represents the digital sampling frequency, and the angular frequency, $\omega$, is equal to $2\pi fT$, where T is sampling interval. Expressed as an equation having variables in the frequency domain:

$$|X(\omega)| \neq 0, |\omega| = |2\pi fT| \leq \frac{2\pi FT}{2} = \pi \qquad (1)$$

In order to lower the sampling rate without aliasing the signal at the lower sampling rate, it is necessary to filter the signal x(n) with a digital low-pass filter that approximates the ideal response characteristic:

$$H(\omega) = 1, |\omega| \leq \frac{2\pi F_1 T}{2} = \frac{\pi}{M} \qquad (2)$$

The ideal filter response of $H(\omega)$ is equal to 0 at any value of angular frequency outside the limit $\pi/M$. M in this expression is the factor by which the sampling rate F is reduced to the new sampling rate, $F_1$ (which is equal to F/M).

The filter h(n) also performs the synchronization function. The spectrum of a convolved output, u(n), can be expressed in frequency domain variables as:

$$U(\omega) = H(\omega)X(\omega) \qquad (3)$$

Expressed in time domain variables, the process can be described as follows: if the filter h(n) has a number of taps, N, the output of direct convolution of the filter h(n) and the signal x(n) can be expressed as:

$$u(n) = \sum_{k=1}^{N} h(k)x(n-k) \qquad (4)$$

Reduction of the sampling rate by the factor M can be expressed as:

$$y(m) = u(Mm) \quad (5)$$

Combining equations (4) and (5), the complete filtering process can be re-written as:

$$y(m) = \sum_{k=1}^{N} h(k)x(Mm-k) \quad (6)$$

Therefore only one filter stage is needed to perform the functions of filtering, resampling and synchronization.

While the present embodiment of the invention is directed to the use of FIR filters, it is contemplated that other types of digital filters, such as infinite impulse response (IIR) filters can preform the same functions of filtering, resampling and synchronization using a single-stage filter.

It is to be understood that the present invention is not limited in scope to use with wellbore seismic surveys, but can be used in any digital recording system requiring resampling of digital signal samples and synchronization of the digital signal samples with a predetermined time reference. The scope of the present invention should be limited only by the claims appended hereto.

What is claimed is:

1. A method of processing digitized signal samples generated by a free running analog-to-digital converter, said samples having a first sample rate, said method comprising the step of:

convolving said digitized signal samples with a single-stage digital filter, wherein an output of said single stage digital filter comprises a series of resampled signal samples having a second sample rate no greater than said first sample rate, said resampled signal samples synchronized with a predetermined time reference, said resampled signals anti-alias filtered corresponding to said second sample rate, said resampled signals bandpass filtered to a predetermined frequency.

2. The method of claim 1 wherein said digital filter further comprises a finite impulse response filter.

3. The method of claim 1 wherein said analog-to-digital converter further comprises a delta-sigma converter.

4. The method of claim 1 wherein said digitized samples correspond to amplitudes of analog signals generated by a seismic sensor.

5. The method of claim 1 further comprising the steps of:

generating an average value of a plurality of said digital signal samples;

subtracting said average value from each following one of said digital signal samples prior to said step of convolving said digital signal samples with said single-stage digital filter, thereby removing a DC offset component from each of said following ones of said digital signal samples; and repeating said steps of generating said average value and subtracting said average value from each of said following ones of said digital signal samples after a predetermined number of said following ones of said digital signal samples have had said DC offset removed.

6. An apparatus for digitizing seismic surveys comprising:

a delta-sigma converter operatively connected to a seismic sensor; and a single-stage digital filter connected to said delta-sigma converter, wherein said single-stage digital filter performs the functions of anti-alias filtering, resampling and interpolation, synchronization and bandpass filtering on digital signal samples generated by said delta sigma converter, and wherein an output of said digital filter comprises, resampled and interpolated digital signal samples synchronized to operation of a seismic energy source.

7. The apparatus as defined in claim 6 wherein said single-stage digital filter further comprises a finite impulse response filter.

8. The apparatus as defined in claim 6 further comprising a buffer for storing an output of said single-stage digital filter.

9. An apparatus for digitizing seismic surveys comprising:

a delta-sigma converter operatively connected to a seismic sensor;

means for calculating an average of a plurality of outputs of said delta-sigma converter;

means for subtracting said average from a single output of said converter; and a single-stage digital filter connected to said means for subtracting, said single-stage digital filter providing the functions of filtering, synchronization and data rate resampling.

10. The apparatus as defined in claim 9 wherein said single-stage digital filter further comprises a finite impulse response filter.

11. The apparatus as defined in claim 10 wherein said finite impulse response filter further comprises a plurality of response coefficient tables adapted to generate resampled digital data samples at a plurality of different spaced-apart time intervals.

12. The apparatus as defined in claim 9 further comprising a buffer for storing an output of said single-stage digital filter.

13. The apparatus as defined in claim 9 further comprising a source controller adapted to initiate a seismic energy source.

\* \* \* \* \*